United States Patent
Marthi et al.

(10) Patent No.: US 11,794,343 B2
(45) Date of Patent: Oct. 24, 2023

(54) SYSTEM AND METHOD FOR HEIGHT-MAP-BASED GRASP EXECUTION

(71) Applicant: Intrinsic Innovation LLC, Mountain View, CA (US)

(72) Inventors: Bhaskara Mannar Marthi, Union City, CA (US); Nan Rong, Union City, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 0 days.

(21) Appl. No.: 17/125,862

(22) Filed: Dec. 17, 2020

(65) Prior Publication Data

US 2021/0187741 A1  Jun. 24, 2021

Related U.S. Application Data

(60) Provisional application No. 62/949,579, filed on Dec. 18, 2019.

(51) Int. Cl.
| | |
|---|---|
| B25J 9/16 | (2006.01) |
| G06T 7/10 | (2017.01) |
| B25J 19/02 | (2006.01) |
| G06T 7/73 | (2017.01) |

(52) U.S. Cl.
CPC ........... *B25J 9/1669* (2013.01); *B25J 9/1612* (2013.01); *B25J 9/1676* (2013.01); *B25J 19/023* (2013.01); *G06T 7/10* (2017.01); *G06T 7/74* (2017.01); *G06T 2207/10028* (2013.01)

(58) Field of Classification Search
CPC ............. B60R 21/0134; B60R 21/013; B60W 50/0098; B60W 2420/52; B60W 2550/20; B25J 9/1669; B25J 9/1612; B25J 9/1676; B25J 19/023; B25J 15/08; G06T 7/10; G06T 7/74; G06T 2207/10028; G06T 2207/20084; G06T 2200/04; G06T 2207/10024; G05B 2219/39473; G05B 2219/39484; G05B 2219/40053; G05B 2219/49296

See application file for complete search history.

(56) References Cited

U.S. PATENT DOCUMENTS

| | | | |
|---|---|---|---|
| 9,626,776 B2 | 4/2017 | Davis et al. | |
| 9,687,983 B1 * | 6/2017 | Prats | B25J 19/04 |
| 10,275,543 B1 * | 4/2019 | Edsinger | G06F 30/00 |
| 2006/0012198 A1 * | 1/2006 | Hager | B25J 15/0009 |
| | | | 294/106 |
| 2015/0178956 A1 * | 6/2015 | Davis | G06T 11/001 |
| | | | 345/582 |
| 2018/0127219 A1 * | 5/2018 | Wagner | B65G 47/82 |
| 2020/0147798 A1 * | 5/2020 | Toris | B25J 9/1682 |
| 2020/0164505 A1 * | 5/2020 | Boer | G06N 3/04 |

OTHER PUBLICATIONS

Lippiello et al. "Visual Grasp Planning for Unknown Objects Using a Multifingered Robotic Hand", IEEE/ASME (Year: 2013).*
Sherly, Christina, "Visual Grasping of Unknown Objects", Degree Project Lulea University of Technology, Aug. 3, 2016.

(Continued)

*Primary Examiner* — Rachid Bendidi
(74) *Attorney, Agent, or Firm* — Fish & Richardson P.C.

(57) ABSTRACT

Systems and method for grasp execution using height maps.

19 Claims, 9 Drawing Sheets

(56) References Cited

OTHER PUBLICATIONS

Stueckler, Joerg, et al., "Real-Time 3 D Perception and Efficient Grasp Planning for Everyday Manipulation Tasks", European Conference on Mobile Robots (ECMR) Orebro, Sweden, Sep. 2011.
Wang, Fan, et al., "Stable bin packing of non-convex 3D objects with a robot manipulator", 2019 International Conference on Robotics and Automation (ICRA), Montreal, QC, Canada, 2019, pp. 8698-8704, doi: 10.1109/ICRA.2019.8794049.
Zeng, Andy, et al., "Robotic pick-and-place of novel objects in clutter with multi-affordable grasping and cross-domain image matching", The International Journal of Robotics Research, Aug. 2, 2019.

\* cited by examiner

SYSTEM AND METHOD FOR HEIGHT-MAP-BASED GRASP EXECUTION

CROSS-REFERENCE TO RELATED APPLICATIONS

This application claims the benefit of U.S. Provisional Application No. 62/949,579, filed 18 Dec. 2019, which is incorporated in its entirety by this reference.

TECHNICAL FIELD

This disclosure relates generally to the robotics field, and more specifically to new and useful systems and methods for grasp execution.

BACKGROUND

Science fiction has long promised the arrival of robots to automate simple tasks, but as robotics technology advances in leaps and bounds, humans have discovered that so many of these 'simple' tasks are not so simple after all. For example, while it is often quite easy for humans to recognize, sort, and grasp objects, this ease is enabled by years of training in a world with consistent physics and many opportunities to interact with different objects. Such deep training, while occurring naturally for humans, is not currently practical for most robotics applications, and so robots must learn to perform tasks given different context (and abilities) than that available to humans.

One particular area in which robots may struggle involves, for a given set of potentially-overlapping objects, deciding how to grasp (and, if desired, move) the set of objects. Thus, there is a need in the field of robotics for new and useful systems and methods for grasp execution. This disclosure provides such new and useful systems and methods.

DESCRIPTION OF THE EMBODIMENTS

The following description of the embodiments is not intended to limit the disclosure or claims to these embodiments, but rather to enable any person skilled in the art to make and use this disclosure.

1. Overview.

The method for grasp execution includes: determining a height map S210; segmenting the height map S220; generating a set of proposed grasps S230; and executing a proposed grasp S240. The method functions to generate candidate grasps for objects within a scene at a plurality of grasp heights.

In an example, the method includes: determining a height map of the scene S210; partitioning the height map into layers S221; segmenting each height map layer; optionally detecting objects from an image of the scene (e.g., wherein the image is pixel-aligned with the height map); optionally retaining segments corresponding with the detected objects from each height map layer; generating a set of proposed grasps for each segment (e.g., from each height map layer); and executing a proposed grasp from the set.

The system and method described herein can be used with: robotic applications, pick-and-place applications, retail applications, and/or any other suitable use case.

2. Benefits

Robotic manipulators have the capacity to enhance efficiency in a number of applications, including many in industry and commerce. Unfortunately, a number of manipulation tasks that would pose little difficulty to humans are, for numerous reasons, more complex to implement using robotic systems.

For example, a task: given a box containing several objects, pick up any one of the objects. This is easy for a person—even without having seen any of the objects in the box, based on vast amounts of intuition gained about the physics of the world and numerous sensory modalities (including not just sight and touch but also the kinesthetic sense, hearing, and even smell), a human can quickly separate the box's contents into distinct objects and generate a strategy for picking one up. The human might even incorporate various strategies into deciding which object to pick up—perhaps the one that looks softest, lightest, most durable, or even the one least tangled up in other objects.

In contrast, this task is far more difficult for a robot than a human. Most of this is due to the enormous complexity involved in generating object detection abstractions that rival the quality of those known to humans, but there are other complexities as well—for example, while robotic manipulators have the ability to be substantially stronger and more precise than human hands, they typically are far worse at "feel" (specifically, the ability to effectively adjust grip based on touch) when grasping objects.

Despite these issues, industry has pressed ahead with automating as many such manipulation tasks as possible (clearly due to the enormous benefits automation may incur). For sort-and-grasp operations, a variety of approaches have been tried, but many use some or all of the following: specialized grasping mechanisms, limited object sets, and known object planning. The first two are used, for example, in warehouse robots that manipulate boxes. Because cardboard boxes are very limited in presentation (e.g., they are almost all rectangular prisms), the set of strategies needed to move them is also limited. Further, the specific nature of the boxes allows the use of specialized grasping mechanisms; in particular, many box-moving robots have suction nozzles that create a vacuum on a box side to grab the box. This technique obviously only works with large flat surfaces that block airflow.

In the case of the box-moving robot, object detection is fairly trivial and there is essentially a single object type. In applications where sort-and-grasp robots must move multiple object types, robots may function by classifying the object as one of a type and then applying grip strategies learned for that object type (referred to as known object planning). In more advanced versions of known object planning, an unknown object may be classified based on its similarity to known objects (and then grip strategies may be applied appropriately). This technique has increased the flexibility of grasping robots, but still faces practical limitations (training even for a single object type can be time consuming, and objects often need to be typed at a fairly specific level).

This system and method can confer several benefits over conventional systems and methods. More specifically, in variants, the system 100 operates using the concept of "unknown object planning"; that is, the system 100 does not require that an object be known (or be similar to a known object) to perform sort-and-grasp operations (though the system 100 may use pre-existing information about known objects in some implementations). In variants, the system 100 does not require the same strict object limitations found in other unknown object planners (e.g., a simple cardboard box moving planner). In variants, this flexibility is enabled by an object-agnostic grasp planning algorithm (described in detail in the sections on the method 200).

3. System

Figure 1:
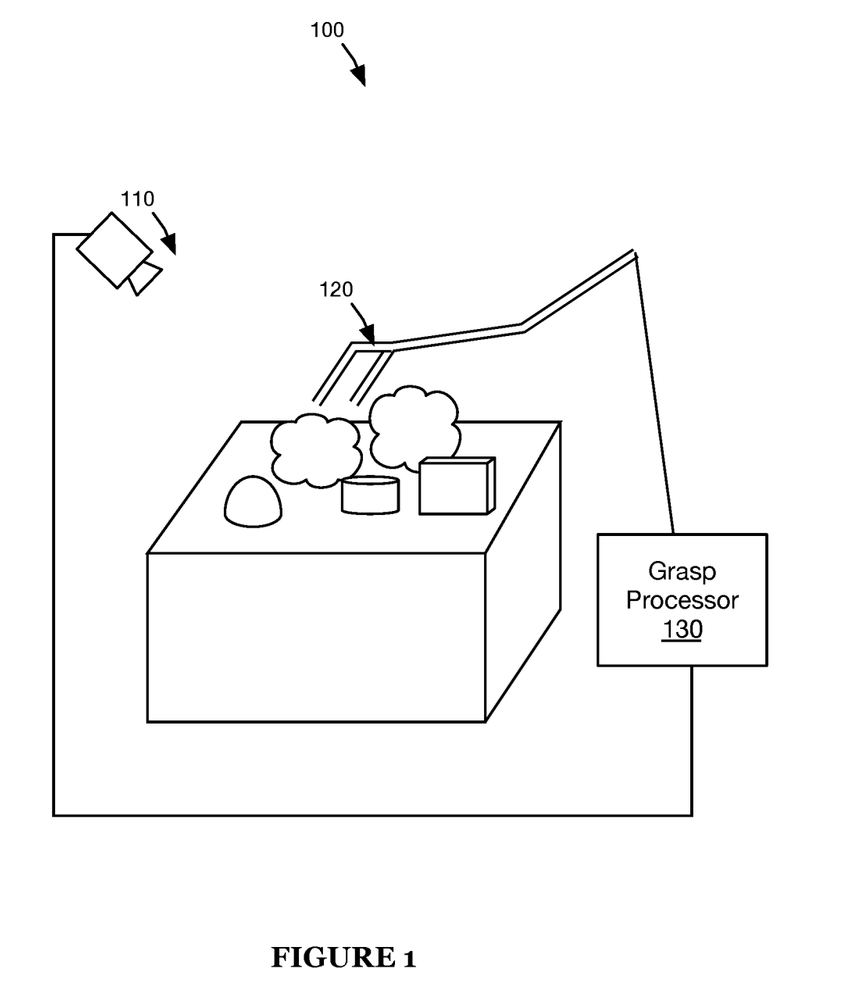
FIG. 1 is a diagram representation of a system of an embodiment.

The system 100 for grasp execution includes one or more of: a sensing system 110, a grasping manipulator 120, and a grasp processor 130, example shown in FIG. 1. The system 100 functions to: sample scene data, propose grasps based on the scene data, and execute grasps of objects within the scene.

The system 100 is described using examples selected from an application in which the grasping manipulator 120 is attached to robotic arm used to pick up objects from one location and move them to another (e.g., unpacking boxes) but it is understood that the system 100 may be used for any application in which a sensing system and grasping manipulator are used in tandem to grasp objects. For example, the system 100 may be implemented as part of an autonomous flying drone rather than a robotic arm.

The system 100 is preferably used with a physical scene. The physical scene can include a set of objects (e.g., grasping targets), ambient environment (e.g., containers, floor, tables, etc.), and/or other physical objects. The physical scene can include or exclude the robot. The objects are preferably arranged in a pile (e.g., on a table, in a container), but can alternatively be spread out (e.g., on a conveyor belt) or otherwise arranged. The surface that the objects rest on is preferably static, but can alternatively be mobile relative to the system (e.g., the sensing system, the robot base, etc.). The set of objects can be diverse, identical, or include any other suitable set of objects. The objects can be known (e.g., previously identified, used to train modules herein, manually specified, etc.) or unknown (e.g., without a known prior).

The sensing system 110 functions to provide scene data to the system 100. This scene data is used to detect objects and plan grasps; visual input may additionally be used as a feedback mechanism for the grasping manipulator 120 (e.g., the visual input may be used in determining position or pose data of the manipulator 120). The scene data can include: images, depth information, point clouds, range information, and/or any other suitable information. The images can include: RGB images, RGB-D images (e.g., color images with a depth channel), video frames, stereoimages, and/or any other suitable visual data.

The sensing system can include one or more: optical cameras (e.g., color cameras, monochrome cameras, monocular cameras, etc.), stereocameras, depth sensors (e.g., projected light, time-of-flight depth sensors, structured light depth sensors, RADAR, LIDAR, etc.), and/or any suitable type of sensing system. When the sensing system includes multiple components (e.g., multiple cameras), different components can be collocated or arranged a predetermined distance apart. Different components can be arranged in the same or different housings, share hardware (e.g., CMOS or CCD sensor), and/or be otherwise related. Different components can output pixel-aligned data (e.g., a depth map that is pixel-aligned with an RGB image), but can alternatively output misaligned data (e.g., wherein the system can include one or more transformation matrices to align the outputs). The sensing system can be arranged on the robot, arranged with a top-down view of the scene, or otherwise arranged. In one example, the sensing system includes both an RGB camera and an active depth camera, but may additionally or alternatively include any sensors usable to detect objects and/or sample information about the scene.

Data from the sensing system 110 may be used to generate a height map in any manner. The depth information (e.g., from the depth sensor, depth channel of the image, etc.) is preferably used to determine the height map, but the height map can additionally or alternatively be generated from color images or any other suitable measurement. The height map can be determined: from the depth map (e.g., used as-is; transformed into a scene frame of reference, etc.); from a mesh representative of the scene geometry (e.g., determined from the depth map, from the point cloud, etc.); from a scene topology determined using a top-down sensor; from one or more stereoimage pairs (e.g., from top-down cameras with overlapping fields of view); or from any other suitable datum. As a specific example, cameras of the sensing system 110 may be mounted to the grasping manipulator 120, and depth information may be determined from changing visual information as the manipulator 120 moves (e.g., change in scale of an object in the visual field may be used along with knowledge of the manipulator 120's movement to determine depth information).

The grasping manipulator 120 functions to move to an object and grasp the object. The grasping manipulator 120 may move in any manner (e.g., by actuating joints, for a robotic arm, or by flying, for a quadcopter drone) and may grasp objects in any manner (e.g., using friction, suction, electrical attraction, magnetic attraction, etc.).

In one embodiment, the grasping manipulator 120 comprises a finger gripper. In an example, the grasping manipulator 120 comprises a robotic arm with a parallel motion griper. Examples of grippers usable by the grasping manipulator 120 include: finger grippers (e.g., two-jaw finger grippers, three-jaw finger grippers, multi-finger grippers), bellows grippers, o-ring grippers, needle grippers, vacuum cup grippers, and electrostatic force grippers.

In some embodiments, aspects of the sensing system 110 may be coupled to the grasping manipulator 120 (e.g., a camera on or near the end of the manipulator 120). The grasping manipulator 120 may additionally or alternatively include any sensors desired for system operation (e.g., pressure sensors for adaptively modifying grip, acoustic sensors for determining material properties of an object, etc.).

The grasp processor 130 functions to, based on a set of instructions and the visual input provided by the sensing system 110, generate a set of possible grasps and execute one or more of these grasps, resulting in the successful grasping of an object (which can then be moved or otherwise handled). The grasp processor 130 may be implemented in any type of circuitry (e.g., analog, digital) and/or software.

The grasp processor 130 can include: height map generator (e.g., configured to perform S210), a partitioning module (e.g., slicing module, configured to partition or slice the heightmap, configured to perform S221), a segmentation module (e.g., configured to segment the heightmap and/or heightmap layers, configured to perform S220), an object detector (e.g., configured to detect one or more objects or contiguous set of pixels associated with an object, based on the image, depth data, and/or other sensor data), a grasp candidate module (e.g., configured to determine potential grasps for each segment, configured to perform S230), a selection module (e.g., configured to filter out potential grasps, configured to select a potential grasp, etc.), and/or other modules.

The grasp processor 130 preferably generates possible grasps as described in the sections on the method 200, but may additionally or alternatively generate possible grasps in any manner.

The system can optionally include: a grasp planner (e.g., configured to plan a path to the selected grasp), a robotic arm, a robotic controller (e.g., configured to control the robotic arm based on the grasp plan), and/or any other suitable component.

In some variations, at least one of the components of the system 100 (e.g., the grasp processor 130, robotic controller, etc.) is implemented as a hardware device that includes one or more of a processor, a display device, a memory, a storage device, an audible output device, an input device, an output device, and a communication interface. In some variations, one or more components included in hardware device are communicatively coupled via a bus. In some variations, one or more components included in the hardware device are communicatively coupled to an external system via the communication interface.

Processors can include one or more of a CPU (central processing unit), GPU (graphics processing unit), NPU (neural processing unit), and any other suitable processing system that functions to execute machine-readable instructions. A processor can execute one or more of the data processors discussed above.

The communication interface functions to communicate data between the hardware device and another device via a network (e.g., a private network, a public network, the Internet, and the like).

In some variations, a storage device of the graph processor 130 includes the machine-executable instructions for performing at least a portion of the method 200 described herein.

In some variations, a storage device of the robotic controller includes the machine-executable instructions for performing at least a portion of the method 200 described herein.

In some variations, at least one component of the system 100 (e.g., the graph processor 130) performs at least a portion of the method 200 described herein.

4. Method

Figure 2A:
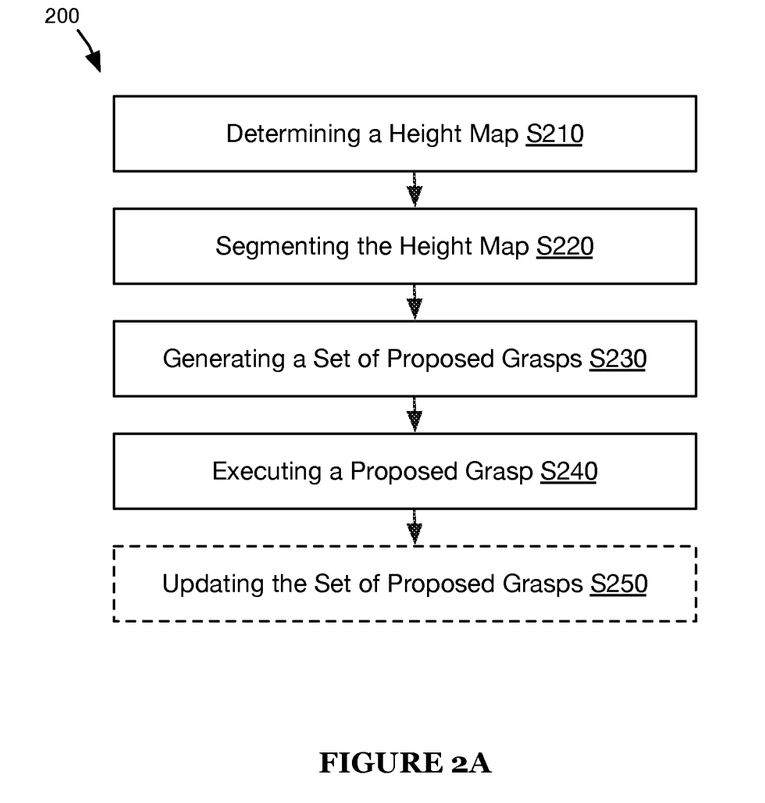
FIG. 2A is a chart representation of a method of an embodiment.

The method 200 for grasp execution includes one or more of: determining a height map S210, segmenting the height map S220, generating a set of proposed grasps S230, and executing at least one of the set of proposed grasps S240, as shown in FIG. 2A. The method 200 may additionally include updating the set of proposed grasps S250.

A different instance of the method is preferably performed for each grasp planning iteration (e.g., each time a grasp is or will be needed), but can additionally or alternatively be performed: serially (e.g., wherein grasps are serially determined), in parallel (e.g., wherein multiple grasps for multiple end effectors are contemporaneously determined), in response to grasp execution, and/or at any other suitable time.

Determining a height map S210 functions to determine geometric information about objects within the scene and/or scene topology. S210 is preferably performed using scene data sampled by the sensor system 110, but can alternatively be performed using synthetic data or any other suitable data. S210 is preferably performed by the grasp processor 130 or height map generator, but can alternatively be performed by any other suitable component.

The height map is preferably of objects within the scene, but can additionally or alternatively be of the ambient environment (e.g., the object container, the robot, etc.). The height map can be referenced from a predetermined floor height (e.g., associated with a predetermined distance of the floor from the sensor system), referenced from the sensor system (e.g., wherein the height map is a depth map), have no frame of reference, or be otherwise referenced. The height map is preferably generated from a depth map and a 2D image (e.g., from an RGB camera), but may additionally or alternatively be generated from any input data. In variants, S210 includes receiving the image, and generating the height map based on the image.

In variants, in the case of a depth camera and an RGB camera, the depth map resulting from the depth camera and the image resulting from the RGB camera not only have different pose, but also may have different image properties. In such an implementation, S210 preferably includes first transforming at least one of the depth image and the RGB image so that the images are aligned. S210 may additionally or alternatively include generating the height map from any input data and in any manner (including processing the height map in any manner). For example, S210 may include generating a height map with reduced dimensionality relative to the depth camera (e.g., height map pixel size is larger than depth camera pixel size).

The height map can include height (or depth) values for all or some of the image pixels, but can alternatively be a mesh, stack of boundaries, or have any other suitable data structure. In a first variation, the height map preferably takes the form of a two-dimensional array. In this variation, each entry in the height map array corresponds to a pixel of a 2D image. Alternatively, each entry in the height map array corresponds to a plurality of pixels of the 2D image. In this variation, each cell of the height map array is associated with a height value. In some implementations, each height value represents a height from a planar reference surface (e.g., a floor, a table, etc.). In some implementations, the planar reference surface is parallel to a gravity vector. However, the height value can represent a height from any suitable planar reference surface.

In variants, the depth map resulting from the depth camera is not the same as the height map, due to camera projection. For example, the depth camera can have an angled pose that senses the planar reference surface from an angle, whereas the heights in the height map represent distance vectors that are parallel to the gravity vector. Moreover, the coordinate system of the heightmap can be different from the coordinate systems of one or more of: the depth camera, the depth image, the RGB camera, and the RGB image.

If depth information is not directly available (e.g., S210 is provided with stereo 2D images, or with 2D images captured during actuator and/or object movement), S210 may additionally or alternatively include generating depth information.

Note that while the words "height" and "depth" are used here, it is generally understood that these terms may correspond to any dimensional information used to create a three-dimensional representation of an environment.

S210 may additionally or alternatively include generating and/or storing any other information relevant to actuator positioning (e.g., robot joint configuration, camera poses, etc.).

However, the depth map can be otherwise determined.

The method can optionally include partitioning the height map into a set of height map layers S221. This can be used in variants where S220 segments individual layers of the height map, which can significantly reduce the complexity of potential grasp generation. However, S221 can be otherwise used. S221 is preferably performed by the grasp processor 130, but can additionally or alternatively be performed by the partitioning module, and/or another system. S221 can be performed using a rule set, filter, neural network, and/or any other suitable method. S221 is preferably performed after S210, but can alternatively be performed at any other suitable time.

S221 preferably partitions (e.g., slices) the heightmap into multiple layers (e.g., 3, 4, 5, 10, 100, etc.), but can alternatively maintain the heightmap at a single layer. Adjacent heightmap layers can be separated by a predetermined height (e.g., gripper length, robotic actuator step size, etc.), be contiguous, or be otherwise related. The heightmap layers can be evenly distributed, unevenly distributed, or otherwise distributed. The heightmap layers are preferably parallel, but can alternatively be skewed or otherwise arranged. Each heightmap layer can be associated with a height level. Each height level can be: a single height (e.g., wherein the heightmap layer is a 2D slice), a range of heights (e.g., wherein the heightmap layer is a 3D slice), or any other suitable set of heights. The height levels can be predetermined (e.g., fixed), dynamically determined (e.g., based on the apex of the height map, nadir of the height map, etc.), or otherwise determined. In one example, a grasping volume can be pre-partitioned into a set of height levels. In a second example, the distance between the minimum and maximum depths of the depth map (or heights of the height map) can be divided into a set of height levels (e.g., according to a set of rules, based on the topological complexity, etc.).

S221 preferably includes identifying the pixels having height values satisfying (e.g., matching, falling within) the respective height level for each heightmap layer. Alternatively, S221 can include slicing the heightmap at predetermined intervals or other partitioning methods. However, the heightmap can be otherwise partitioned into heightmap layers.

Figure 2B:
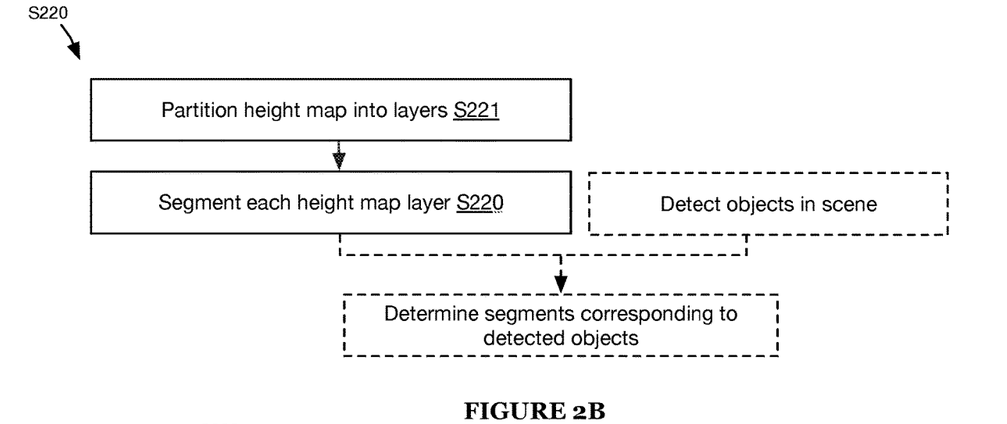
FIG. 2B is a chart representation of segmenting a height map, in accordance with an embodiment.
Figure 5A:
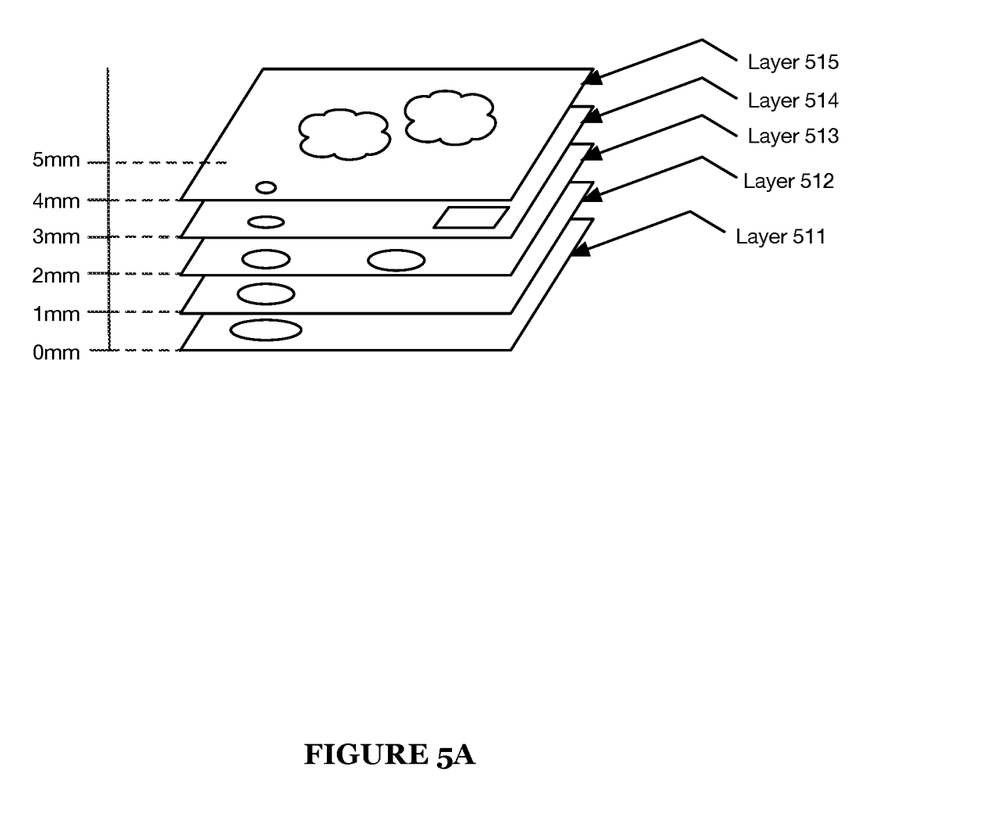
FIG. 5A is a first example representation of height map layers of an embodiment.
Figure 5B:
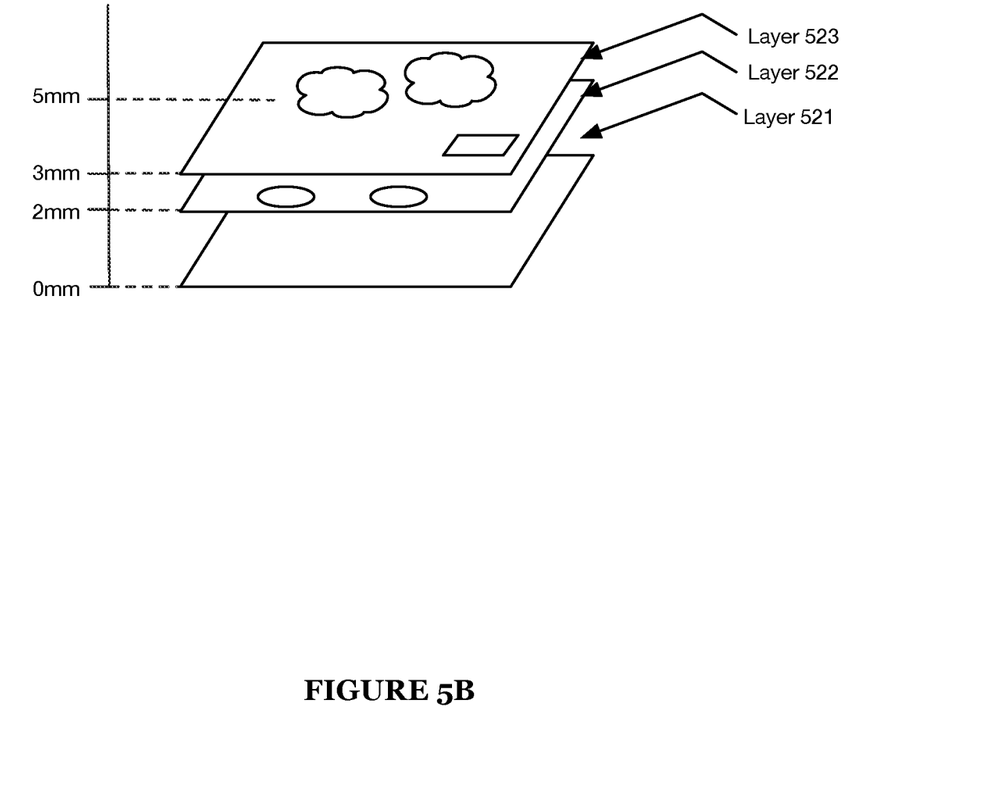
FIG. 5B is a second example representation of height map layers of an embodiment.

In one variation, the height map is partitioned by height into a plurality of height map layers (S221 shown in FIG. 2B), with each height map layer restricted to the height map pixels within a certain height range. FIGS. 5A-B depict exemplary height map layers 511-515, and 521-523 resulting from partitioning of a height map at S221.

In a first example, S220 includes partitioning the height map into layers at fixed height ranges (fixed partitioning) (e.g., height layer one corresponds to height range 0-1 mm, layer two corresponds to height range 1-2 mm, and so on) (as shown in FIG. 5A). In a second example, S220 includes partitioning the height map into layers at varying height ranges (e.g., some layers can have larger height ranges than others) (as shown in FIG. 5B). In a third example, S220 includes partitioning the height map into layers having dynamically determined ranges (dynamic partitioning) (e.g., layer one covers ten percent of the total height range between min and max height, or layer one includes the top ten percent of pixels, sorted by height).

In variants, at S221, attributes for each height map layer can be determined based on attributes of one or more of: a bin containing objects to be grasped by the grasping manipulator 120; the grasping manipulator; known objects that are likely to be grasped by the grasping manipulator 120; the RGB image generated by the sensing system 110; the sensing system 110; and environmental attributes. In some implementations, attributes for a height map layer include a minimum height and a maximum height (wherein the min and max height of the layer define the depth of the layer).

In an example, the lowest height map layer has a minimum height that is greater than or equal to a minimum height defined for the environment (e.g., a table height, a height of a bottom of a bin that contains the objects to be grasped etc.). In an example, the lowest height map layer has a minimum height corresponds to a grasping depth of the grasping manipulator 120. In an example, the lowest height map layer has a minimum height corresponds to a grasping depth of the grasping manipulator 120, and known (or expected) heights of objects likely to be grasped by the grasping manipulator. For example, if the grasping manipulator 120 is being used for top-down grasping of objects that are likely to have a height of at least 50 cm above base surface (e.g., a table, a bottom of a bin, etc.), and the grasping depth of the grasping manipulator is 20 cm, then the minimum height of the lowest height map layer is set to 30 cm above the base surface (50 cm-20 cm). In other words, if the grasping manipulator (performing top down grasps) will not be able to execute a top down grasp lower than 30 cm without colliding with (or knocking over) another object, then the minimum height for the lowest layer can be set to a value that excludes all grasps that are either infeasible, or would result in collision or movement of other objects. In other words, generation of the height map layers can be performed to restrict generation of proposed grasps (at S230) that are not useful.

In an example, the highest height map layer has a highest height that is lower than or equal to a maximum height graspable by the grasping manipulator 120 (as determined by attributes and/or constraints of the grasping manipulator, physical positioning of the grasping manipulator in the operating environment, etc.).

In an example, the depth of at least one height map layer has a depth that corresponds to a graspable depth of the grasping manipulator 120. For example, for a manipulator with a maximum grasp depth of 5 cm, the depth of each height map layer is 5 cm.

In an example, the depth of at least one height map layer has a depth that corresponds to a shape of at least one known graspable object. For example, for a bottle having a known shape, a first height map layer can be generated the neck of the bottle, and at least a second height map layer can be generated for the body of the bottle. The layer for the neck of the bottle can have a depth that corresponds to the known (or estimated) length of the neck of the bottle, and the layer for the body of the bottle can correspond to the known (or estimated) length of the body of the bottle.

Segmenting the height map S220 functions to identify height map segments associated with individual objects (or groups of objects). These height map segments can subsequently be used to determine grasp candidates for an object. The segment can be a 2D segment, a 3D segment, and/or have any other suitable dimensionality. The segment can be a boundary, a bounded region, and/or otherwise defined. S220 is preferably performed by the grasp processor 130, but can additionally or alternatively be performed by: the segmentation module, the object detector, and/or another system. S220 is preferably performed after S221, but can alternatively be performed at any other suitable time.

Height map segmentation can be performed using: foreground/background segmentation (e.g., using differences in height, differences in pixel gradients, etc.), blob detection, feature detection, heuristics (e.g., spatial proximity, morphological heuristics), rules, trained neural networks, and/or otherwise segmented.

Figure 7:
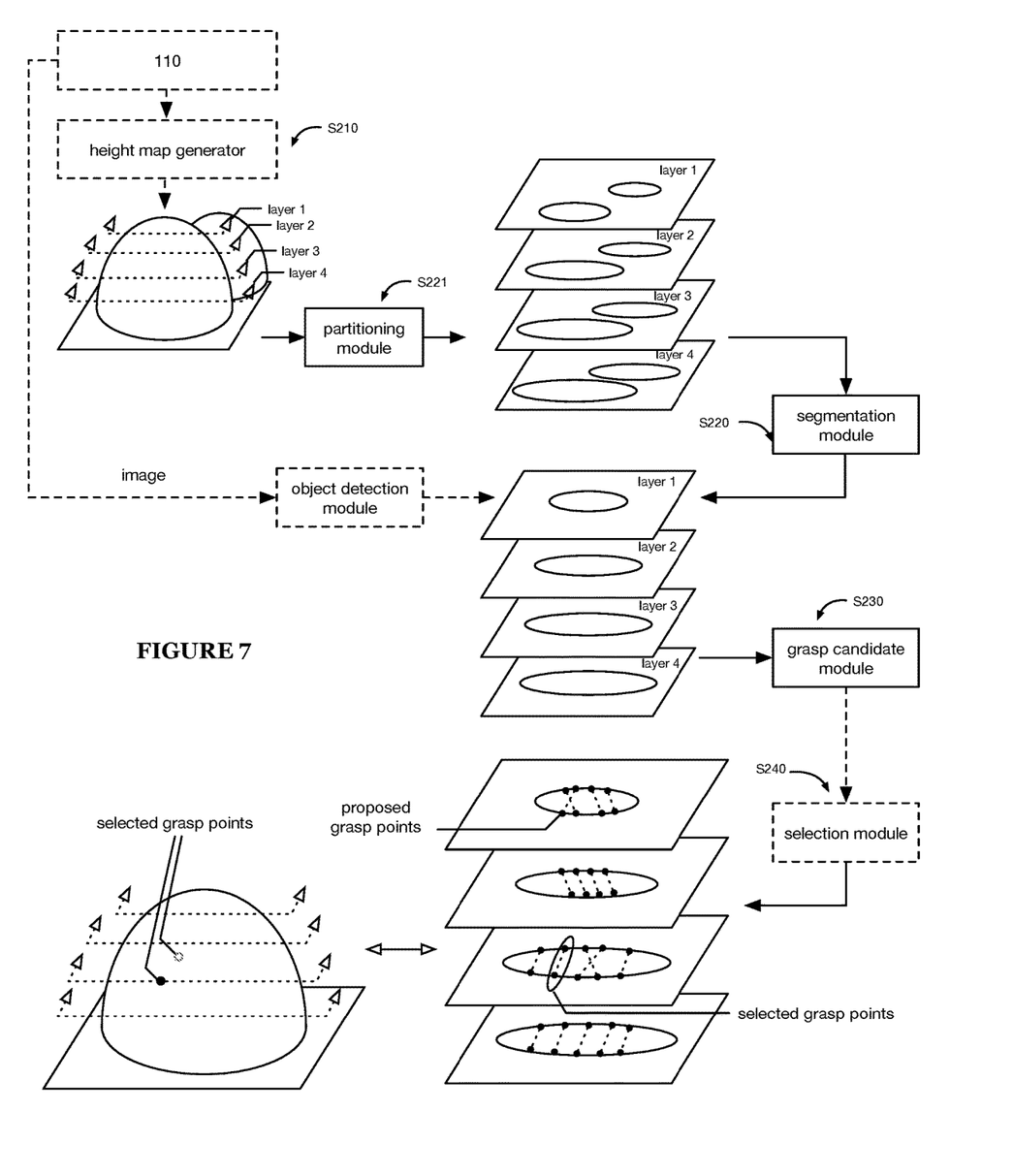
FIG. 7 is an illustrative example of the system and method.

S220 can segment: the entire height map, individual layers (or slices) of the height map (e.g., determined in S221; example shown in FIG. 2B and FIG. 7), or any other suitable portion of the height map. S220 can be applied to all or a portion of the height map layers determined in S221.

In a first variation, the height map layer is segmented only based on the information in the height map layer. In this variation, S220 can include identifying object boundaries and/or closed loops in the pixels remaining in the height map layer (e.g., using a CNN, a feature detector, etc.), and treating each height map layer region within the object boundary and/or closed loop as a segment.

In a second variation, the height map layer is segmented based on the height map layer information, in addition to height map information (e.g., from the region of the height map above the layer). For example, segments can be identified by projecting the height map portion above the height map layer (e.g., the height map points, a convex hull, etc.) into the height map layer.

In a third variation, S220 includes segmenting the height map layer using spatial proximity and morphological constraints.

In a fourth variation, S220 includes: generating a convex hull based on the heightmap, segmenting the convex hull into object segments, partitioning the convex hull into layers, wherein each layer includes object segments inherited from the convex hull segmentation, and projecting each convex hull layer (with the segmentation information) into the height map to identify the pixels associated with each object segment.

However, the layers can be otherwise segmented into object segments.

Figure 3:
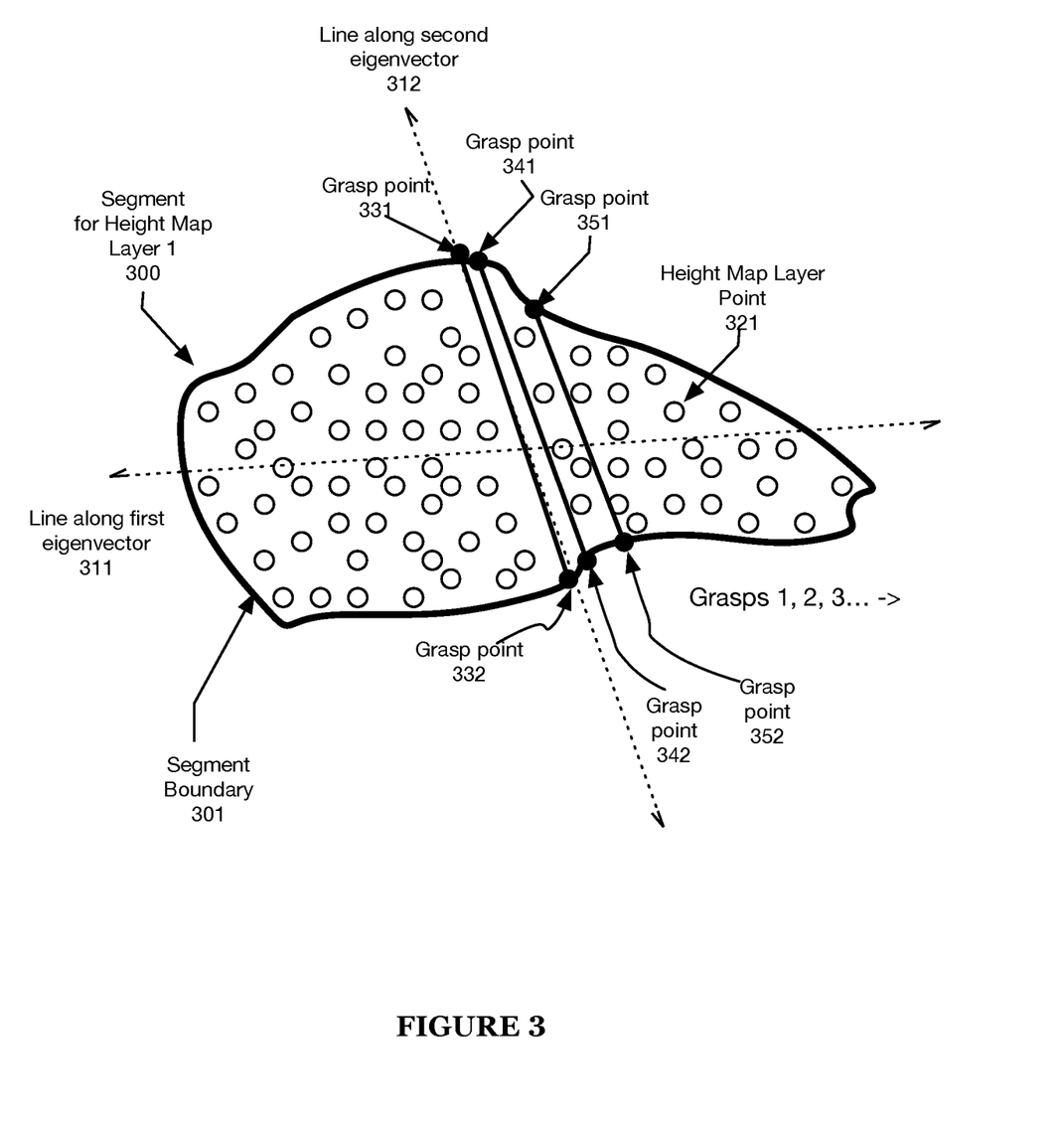
FIG. 3 is an example representation of a first grasp generation algorithm of an embodiment.
Figure 4:
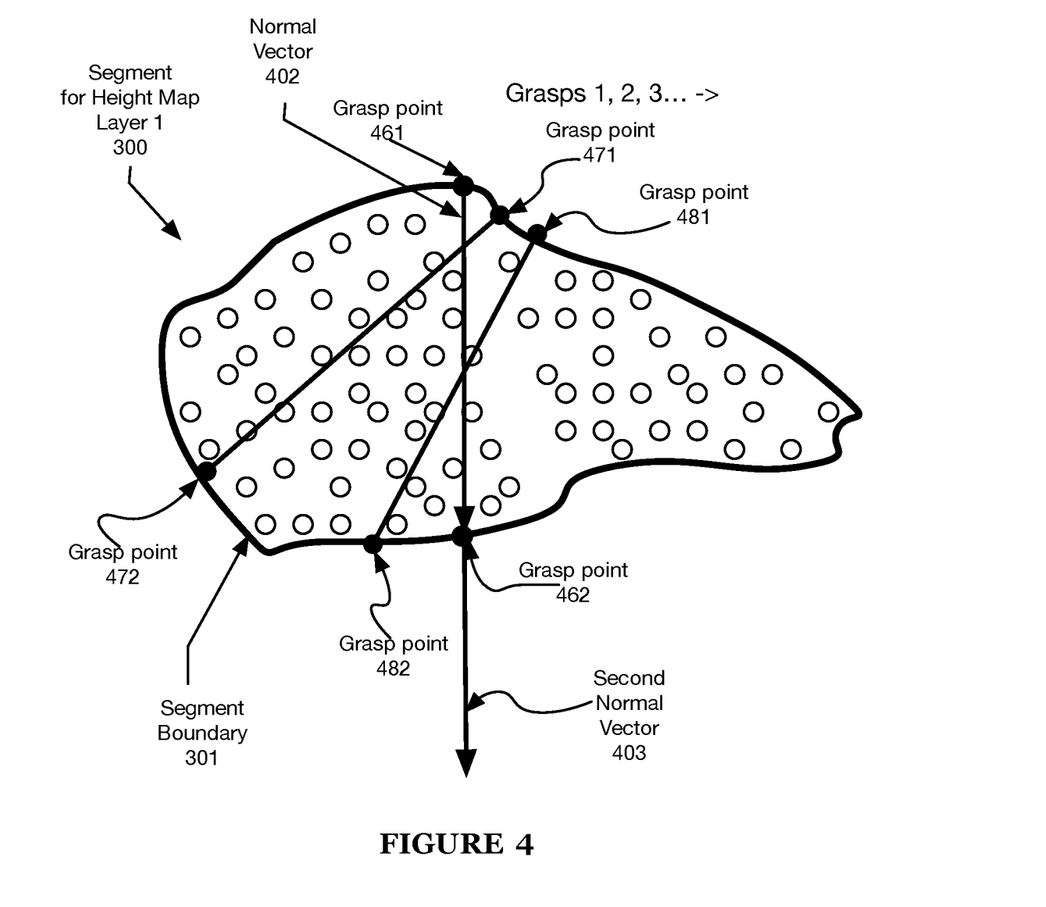
FIG. 4 is an example representation of a second grasp generation algorithm of an embodiment.

In an example, FIGS. 3 and 4 depict an exemplary segment 300 for a height map layer 1. In variants, a segment includes one or more points (e.g., 321 shown in FIG. 3) of the height map layer. In variants, each segment generated at S220 includes a minimum number of points (e.g., 321 shown in FIG. 3) in the corresponding height map layer. The minimum number of segment points in a segment can be configured to eliminate segments that cannot be grasped by using a gripper of the grasping manipulator 120. Segmentations can be configured to generate segments having minimum dimensions that conform to dimensions of a gripper of the grasping manipulator 120. For example, segmentation performed at S220 can be performed such that each segment has at least a minimum width or height. Segments can also be generated such that each segment has a maximum width or height. By generating segments that conform to dimensions of the gripper, segments that cannot be grasped by the gripper can be eliminated at the segmentation stage. In variants, segmentation can be performed based on attributes of one or more of a bin that contains objects to be grasped, the grasping manipulator, known objects, the RGB image, the sensing system no, and the like.

In some variations, S220 includes: for at least one height map layer, smoothing (or processing) the segments (for one or more height map layers) in any manner (e.g., noise reduction, contour smoothing, etc.).

The method can optionally include detecting objects in an image, which functions to increase the layer segmentation accuracy. The objects can be detected in parallel with heightmap processing, after height map segmentation, as part of S220, and/or at any other suitable time. The objects can be detected using the grasp processor 130 and/or the object detector, or using any other suitable system.

The objects are preferably detected based on an image (e.g., RGB image) of the same scene as the depth map (e.g., taken concurrently or asynchronously with the depth map), but can additionally or alternatively be determined based on the depth map, a combination thereof (e.g., wherein both the image and depth map are fed into the same neural network), the RGB-D image, and/or any other suitable information. The image is preferably pixel-aligned with the depth map, but can alternatively be otherwise aligned with the depth map.

The objects are preferably detected using a trained neural network (e.g., trained to detect the objects in the scene, trained to detect boundaries, etc.; such as CNNs, SSD, YOLO, deformable convolutional networks, etc.), but can alternatively be detected using feature-based methods (e.g., SIFT, Viola-jones, HOG features, etc.), and/or any other suitable method.

The detected objects (e.g., and/or masks thereof) can be used to refine the layer segmentation. The detected objects can further be used to associate the layer region between the segment boundaries with the segment. However, the detected objects can be otherwise used. If more complex object detectors are used in performing the method 200, the results of this object detection may be later used to inform grasp generation (e.g., noting that an object is deformable or not may affect grasp strategy), but this is not necessary for functioning of the method 200.

In a first variation, the detected objects are used to filter out segments in each height map layer. In an example, each height map layer is pixel-aligned with the image. For each height map layer, the segments (resulting from the segmentation) that overlap more than a predetermined threshold (e.g., 30%, 50%, 70%, 80%, 90%, 100%, etc.) with an object detected in the image (and/or the mask thereof) are identified and selected for use in generating proposed grasps at S230. Segments that do not substantially intersect with a detected object may be rejected, and not used to generate a proposed grasp at S230.

In a second variation, the detected objects are used in S220 to segment the layer and/or partition the heightmap. In this variation, the mask of each detected object can be projected onto each heightmap layer, wherein the pixels having the layer level and falling within a mask projection are associated with a layer segment.

However, the detected objects can be otherwise used.

Generating a set of proposed grasps S230 functions to generate a set of grasp candidates based on the heightmap layer segments. The heightmap layer segments can be those from S220, heightmap layer segments that overlap (at least to a certain degree) with an object detected in the image (e.g., the RGB image), and/or any other suitable set of segments. S230 is preferably performed by the grasp processor 130 or grasp candidate module, but can alternatively be performed by any other suitable system. S230 is preferably performed after S220, but can alternatively be performed at any other suitable time. In variants, at least one proposed grasp in the generated set of proposed grasps is a grasp for a grasping manipulator (e.g., 120).

A grasp can be: a point along the object surface (e.g., a suction point), a pair of points along the object surface (e.g., object side, object boundary), and/or otherwise defined. The grasp candidates (proposed grasps) are preferably specific to a grasp manipulator type (e.g., an end effector type), but can alternatively be generic, shared between grasp manipulators 120, or otherwise determined. For example, different grasp manipulators can specify: different grasp types, different grasp candidate generation methods, different generation parameters (e.g., different separation distances between grasp candidates, different heightmap layers to consider, different segment filters, etc.), and/or other parameters. The grasp generation methods can additionally or alternatively be predetermined, be determined based on: environmental data (e.g., the complexity of a segment, the number of segments, density of segments within a layer, size of segments, etc.); the object type (e.g., predetermined, determined during object detection, determined using semantic segmentation of an associated image, etc.), and/or otherwise determined.

S230 preferably generates a set of proposed grasps for each segment of each heightmap layer, but can alternatively generate a set of proposed grasps for all or a subset of the heightmap layers, all or a subset of the segments, and/or any other suitable element. The set of proposed grasps can include: a predetermined number of grasps, all possible grasps, all grasps satisfying a predetermined set of conditions (e.g., grasps separated by an end effector width or other separation distance), and/or any other suitable grasp candidate. For example, S230 preferably includes generating at least one grasp for at least one segment (e.g., 301 shown in FIGS. 3 and 4) in at least one height map layer (S231 shown in FIG. 2C).

In variants, S230 includes generating grasps for only a subset of height map layers. For example, S230 include generating grasps for height map layers with heights above some threshold height. The threshold height can be configured to represent a minimum height of objects that are to be grasped by the grasping manipulator 120. However, the threshold height can be otherwise configured.

In variants, S230 includes generating a subset of possible grasps for a given height map layer. In an example, the system stops generating new grasps for a segment of a height map layer once a certain number of grasps have been generated that have a grasp score above a threshold grasp score. In this manner, rather than generating all possible grasps for a segment, grasp generate for a segment stops when enough grasps have been generated that have scores that are above the threshold grasp score. A grasp's grasp score identifies the predicted quality or cost of the grasp. A grasp score can be generated by any suitable grasp scoring system after generation of the grasp. In variants, the attributes of one or more of a bin that contains objects to be grasped, the grasping manipulator, known objects, the RGB image, the sensing system no, the grasp points of the grasp and the like can be used to generate a grasp score for a grasp (for a segment of a height map layer).

A possible grasp is preferably one in which the grasping distance is within a range of a manipulator's grasping ability, but may additionally or alternatively have other criteria (e.g., a certain amount of clearance extending beyond the grasp to allow for the size of a manipulator's jaws). Grasps may be defined in any manner (e.g., as two points, corresponding to initial positions of a 2-jaw gripper).

The proposed grasps can be generated using: principal component analysis (PCA), antipodal grasp analysis, surface normal identification, and/or any other suitable method.

In a first variation, S230 includes: generating a proposed grasp for a segment of a height map layer based on a principal component of the segment. The principal component of the segment (e.g., major dimension) can be computed from the coordinates of the points included in the segment, within a coordinate space of the height map layer that includes the segment's points. Generating a proposed grasp for a segment based on a principal component of the segment can include: for a given height map layer (e.g., height map layer 1, shown in FIG. 3), performing a principal component analysis (PCA) process for the segment (e.g., 301 shown in FIG. 3) of the height map layer. In one example, performing the PCA process for the segment includes processing the height map points (e.g., 321) included in the segment (e.g., 300) and outputting: a first eigenvector 311 (shown in FIG. 3) that represents the first principal component of the points in the segment 300, and a second eigenvector 312 (shown in FIG. 3) that represents the second principal component of the points in the segment 300. In this variation, after performing the PCA process for the segment (e.g., 300), S230 includes taking an eigenvector generated from the PCA process (preferably the second eigenvector 312, corresponding to the second principal component with second-greatest variance) and identifying intersection points (e.g., 331, 332 shown in FIG. 3) between the eigenvector and the segment boundary (e.g., 301 shown in FIG. 3). In an example, the intersection points between the segment boundary and the eigenvector are identified by traversing along the eigenvector from the center of the segment to the segment boundary (in both directions). The intersection points (e.g., 331 and 332 shown in FIG. 3) between the second eigenvector and the boundary (at both ends) form a first proposed grasp. After checking if a grasp is possible at this location, S230 may include checking parallel grasps translated across another eigenvector resulting from the PCA analysis (e.g., the first eigenvector 311), as shown in FIG. 3. For example, after identifying grasp points 331 and 332 for the first grasp, the grasp processor 130 translates the second eigenvector 312 along the first eigenvector 311, and identifies a pair of grasp points (e.g., <341, 342>, <351, 352> shown in FIG. 3) that lie on a line that is parallel to the second eigenvector 312 and that intersect the segment boundary 301. In variants, the grasp processor 130 translates the second eigenvector 312 along the first eigenvector 311 at fixed increments. In other variations, the grasp processor 130 translates the second eigenvector 312 along the first eigenvector 311 at varying increments. The translation distance can be predetermined, or dynamically determined. The distance can be determined based on attributes of one or more of a bin that contains objects to be grasped, the grasping manipulator, known objects, the RGB image, the sensing system no, and the like.

In a second variation, S230 includes generating a proposed grasp for a segment of a height map layer by performing an antipodal grasp generation process. Performing an antipodal grasp generation process can include: starting at a point (e.g., 461 shown in FIG. 4) along a boundary of the segment (e.g., 301 shown in FIG. 4), computing a normal vector (e.g., 402; internal normal vector) that is normal to the segment boundary (e.g., 301), and identifying intersection points (e.g., 461 and 462) between the computed normal vector and the segment boundary. In an example, the intersection points between the normal vector and the segment boundary are identified by starting at the first boundary point (e.g., 461) that lies on the normal vector, moving across the segment 300 in the direction of the normal vector until an intersection with the segment boundary is reached at a second boundary point (e.g., 462 shown in FIG. 4). The intersection points (e.g., 461 and 462 shown in FIG. 4) between the normal vector (e.g., 402) and the boundary (at both ends) cooperatively form a first proposed grasp. These two boundary points (e.g., 461 and 462) may be checked as a possible grasp. In an example, a second normal vector (e.g., 403 shown in FIG. 4) is computed at the second boundary point (e.g., 462), and if the second normal vector (e.g., 403) is in approximately the same direction as the first normal vector (e.g., 402), then the boundary points (e.g., 461 and 462) are selected as a possible grasp pair. After checking if a grasp is possible in this location, S230 may include moving along the boundary and performing the same process, as shown in FIG. 4. The system can traverse along the boundary (e.g., 301) and generate additional grasps for one or more boundary points (e.g., 471, 481), as shown in FIG. 4. A second grasp is identified by points 471 and 472, and a third grasp is identified by points 481 and 482. The boundary can be traversed in any suitable manner. In variants, the boundary is traversed at fixed increments. In other variations, the boundary is traversed at varying increments. The distance between each successive boundary point used to identify a grasp can be predetermined, or dynamically determined. The distance can be determined based on attributes of one or more of a bin that contains objects to be grasped, the grasping manipulator, known objects, the RGB image, the sensing system 110, and the like.

At S230, grasps for a given segment are generated until a stopping condition is satisfied. The stopping condition can be: determination of a minimum number of grasps (e.g., for the segment, for the layer, for the scene, etc.), a predetermined period of time elapsing, and/or any suitable condition. In an example, a stopping condition is satisfied after a minimum number of grasps have been identified for a segment.

Figure 6:
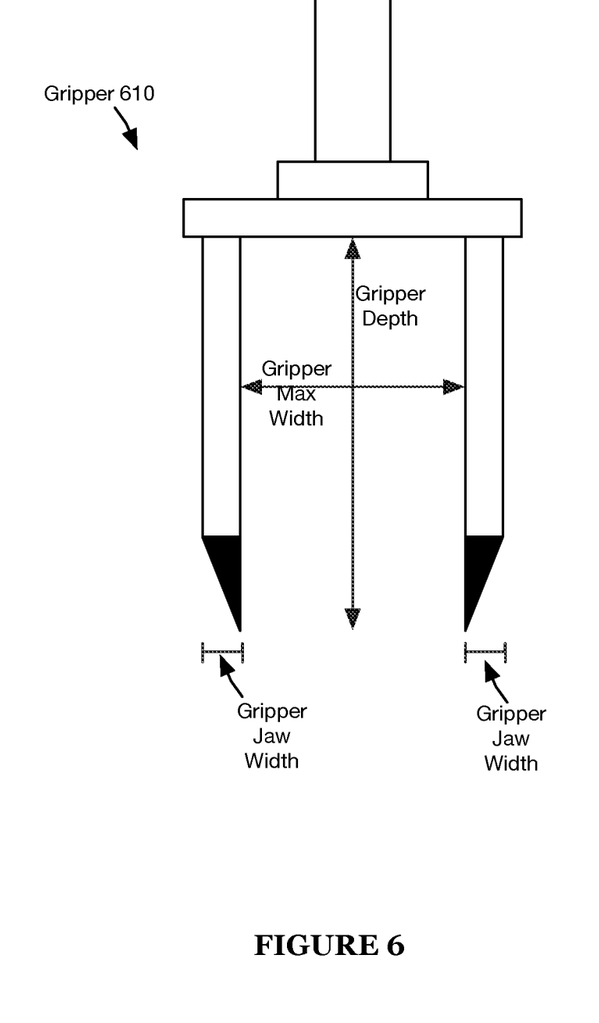
FIG. 6 is an example representation of a gripper of an embodiment.

The method can optionally include checking whether a grasp is possible at a location, which functions to eliminate unachievable grasp candidates from consideration. Checking whether a grasp is possible can include determining whether the width of the grasp (e.g., distance between the two grasp points) is less than a maximum width of a gripper (e.g., 610 shown in FIG. 6) to be used for the grasp. Checking whether a grasp is possible at a location can additionally or alternatively include determining whether the gripper (e.g., 610 shown in FIG. 6) will collide with other objects (or a bin) based on a location of the grasp points and jaw widths of the gripper's jaws. However, any suitable process can be performed to determine whether a grasp is possible.

Figure 2C:
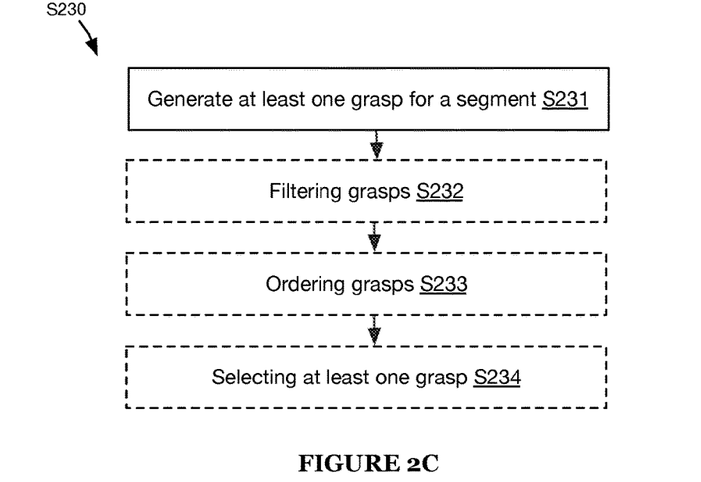
FIG. 2C is a chart representation of generating a set of proposed grasps, in accordance with an embodiment.

S230 may additionally or alternatively include filtering possible grasps (S232 shown in FIG. 2C). The grasps can be filtered after grasp generation completion, during grasp generation, before grasp generation (e.g., used to filter the grasp generation method or the type of grasp that is generated), or filtered at any other suitable time. Grasps can be filtered by the grasping processor 130 or selection module, but can be filtered by any other suitable system. In variants, the grasps are filtered based on attributes of one or more of a bin that contains objects to be grasped, the grasping manipulator, known objects, the RGB image, the sensing system no, and the like. The grasps can be filtered based on one or more of: gripper width, kinematic feasibility of the grasp based on the constraints imposed by the grasping manipulator 120, collision checking (e.g., for collisions between the grasping manipulator and other objects and/or a bin containing the objects to be grasped), and/or any other suitable constraint. For example, the two techniques described above for generation of grasps (e.g., principal component analysis, antipodal grasp generation) may include generating grasps solely based on gripper range, and then filtering based on clearance (e.g., potential grasps where the start points are too close to another segment may be rejected). Grasps may be filtered in any manner. Note that grasps in a given height layer may be filtered not just based on data within that layer, but within other layers as well (e.g., it may be desirable to enforce a certain amount of clearance in layers above or below the layer for which grasps are being filtered).

In variants, proposed grasps are filtered based on a minimum distance between the grasp points (e.g., 331, 332) of a grasp. In variants, proposed grasps are filtered based on a maximum distance between the grasp points (e.g., 331, 332) of a grasp.

S230 may additionally or alternatively include ordering grasps (S233). S233 is preferably performed after S232, but can alternatively be ordered before S232 or at any other suitable time. Grasps can be ordered by the grasping processor 130 or selection module, or by any other suitable system.

Grasps can be ordered: for the scene, for an object within the scene, for a heightmap layer, for a segment, and/or for any other suitable data structure.

Grasps can be ordered based on one or more of: a grasp quality score; a corresponding segment height; a corresponding layer height; a graspability score; grasping manipulator collision probability; an antipodality score; clearance; detection quality; and/or any other suitable metric. The grasp quality score can identify an overall quality of the grasp, based on one or more factors (e.g., graspability, collision, grasp time, etc.). The graspability score can identify a likelihood of successfully grasping the associated object by using the grasp. The graspability score can be determined based on heuristics, rules, using a neural network, calculated (e.g., based on a predetermined equation; based on a surface normal determined from the height map; based on the distance between the grasp point and an adjacent object; etc.), or otherwise determined. The grasping manipulator collision probability can identify a likelihood that the grasping manipulator 120 collides with another object, or a bin, during execution of the grasp. The antipodality score can identify the degree to which the grasp is centered on the object (e.g., wherein an object center can be determined from the object detection, a layer segment, etc.). In variants, the antipodality score can be generated by: performing object detection (e.g., Yolo detection, etc.) on the image to identify a center of the object in the coordinate space of the image; identifying the corresponding height map layer coordinates of the identified object center in the height map layer associated with the grasp; and comparing the coordinates of the grasp points of the grasp (e.g., 481, 482 of FIG. 4) with the coordinates of the identified object center. The antipodality score can additionally or alternatively be determined based on the angle of the grasp relative to a principal axis of the object (e.g., determined from the PCA analysis, determined from the object segment or object detection, etc.). However, the antipodality score can be otherwise determined. However, the grasps can be otherwise ordered.

Note that while grasps may be ordered within segments or layers, grasps may be also ordered across the environment as a whole (not necessarily based on ordering of the layers or segments). In a first example, grasps are ordered by decreasing height of the corresponding layer. In a second example, grasps are ordered by decreasing height of the corresponding segment or object. In a third example, grasps are ordered by increasing height of the corresponding layer. In a fourth example, grasps are ordered by increasing height of the corresponding segment.

S230 preferably includes selecting at least one grasp (S234 shown in FIG. 2C). S234 is preferably performed after S233, but can alternatively be performed before S233 or at any other suitable time. Grasps can be ordered by the grasping processor 130 or selection module, or by any other suitable system. In a first example, any one or more of the grasps generated at S231 can be selected. In a second example, filtering is performed (at S232) before selection, and at least one filtered grasp is selected at S234. In a third example, the grasps generated at S231 are ordered (at S233), and at least one grasp is selected at S234 based on the order of the grasps determined at S233. In a fourth example, the grasps generated at S231 are filtered at S232, and then ordered (at S233), and at least one grasp is selected at S234 based on the order of the filtered grasps determined at S233.

In variants, selecting at least one filtered grasp (e.g., a grasp that is not rejected after filtering is performed at S233) includes: for at least one height map layer partitioned at S221, selecting a grasp for each segment generated for the layer at S220.

S240 includes executing at least one of the set of proposed grasps. S240 is preferably performed after a grasp is selected, but can alternatively be performed at any other suitable time. Grasps can be executed by the robotics controller, or by any other suitable system. S240 preferably includes executing the selected grasp (e.g., from S234), but can additionally or alternatively include executing the proposed grasps in the order determined in S233 (e.g., in series, in parallel, in response to a higher-ranked grasp failing, etc.), and/or executing any other suitable number of grasps in any other suitable order.

S240 preferably includes controlling the robotic arm to move the grasp manipulator 120 to the grasp an object within the scene at the selected grasp location(s). S240 can include: determining a grasp plan (e.g., grasp path) to the selected grasp, determining control instructions based on the grasp plan, and executing the control instructions. However, the grasp can be otherwise executed. S240 may function in any manner, based on the physical modality of the manipulator. For the case of a 2-jaw gripper, S240 may include orienting and moving the gripper to a starting point and partially closing the jaws (to execute the grasp).

The method can optionally include updating the set of proposed grasps S250. S250 includes updating a set of grasps after a grasp has been executed. For example, if an object has been removed from an environment as a result of S240, S250 may include performing another instance of the method (e.g., sampling another set of images, calculating a new set of grasps, etc.), recalculating grasps from the old images, simply removing grasps corresponding to the removed object, or otherwise updating the set of possible grasps. S250 may additionally or alternatively include modifying how grasps are generated (e.g., if S240 results in a failed grasp, S250 may recalculate grasps using a different technique than originally used).

S250 may additionally or alternatively include updating grasps in any manner.

The methods of the preferred embodiment and variations thereof can be embodied and/or implemented at least in part as a machine configured to receive a computer-readable medium storing computer-readable instructions. The instructions are preferably executed by computer-executable components preferably integrated with a robotic manipulator. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for grasp selection within a scene of piled objects, the method comprising:
receiving scene data including a depth map and a two-dimensional (2D) image that characterizes the scene, the scene comprising a pile of objects, wherein the scene data is captured from above a maximum height of the pile of objects;
generating, from the depth map and the 2D image included in the scene data, a height map of the scene, wherein the height map comprises a respective height value for each of a plurality of height map points corresponding respectively to a plurality of 2D image pixels included in the 2D image;
partitioning the height map into a plurality of height map layers based on identifying height map points having height values that lie within a respective height range for each of the plurality of height map layers;
generating, for a first height map layer of the plurality of height map layers, a set of height map layer segments, wherein within the first height map layer of the plurality of height map layers, each height map layer segment includes height map points that correspond to a distinct object of the pile;
for the first height map layer of the plurality of height map layers, generating a set of grasps having grasp points that are on a segment boundary of a first height map layer segment within the first height map layer; and
selecting a generated grasp; and
executing the selected grasp for a respective object corresponding to the height map layer segment of the selected grasp by controlling a grasping manipulator.

2. The method of claim 1, wherein selecting the generated grasp comprises selecting a generated grasp for each height map layer segment.

3. The method of claim 1, wherein partitioning the height map into the plurality of height map layers comprises: partitioning the height map based on attributes of one or more of: a bin that contains objects to be grasped, a grasping manipulator, known objects, the image, and a sensing system.

4. The method of claim 1, wherein generating the set of height map layer segments comprises: generating segments by spatial proximity within the first height map layer and morphological constraints, wherein the morphological constraints are independent of object geometry.

5. The method of claim 1, wherein generating the set of height map layer segments comprises:
detecting objects in the image, wherein the image is pixel-aligned with the height map; and
removing height map layer segments that do not overlap with an object detected in the image, wherein the set of grasps are generated for a remaining height map layer segment.

6. The method of claim 1, wherein generating the set of grasps comprises: generating a grasp based on a principal component of the height map layer segment.

7. The method of claim 1,
wherein each grasp comprises a pair of grasp points,
wherein generating a pair of grasp points for the first height map layer segment comprises:
performing a principal component analysis (PCA) process using points included in the first height map layer segment to generate a second eigenvector that represents a second principal component of the points in the first height map layer segment; and
identifying intersection points between the second eigenvector and a segment boundary of the first height map layer segment,
wherein the intersection points form the pair of grasp points that represent a grasp for the first height map layer segment.

8. The method of claim 1, wherein generating the set of grasps comprises: generating a grasp by performing an antipodal grasp generation process for the first height map layer segment.

9. The method of claim 1,
wherein each grasp comprises a pair of grasp points,
wherein generating a pair of grasp points for the first height map layer segment comprises: performing an antipodal grasp generation process using points included in a boundary of the first height map layer segment; and
wherein performing the antipodal grasp generation process to generate the grasp for a boundary point included in the boundary comprises:
computing a first normal vector that is normal to the boundary; and
identifying intersection points between the computed normal vector and the boundary, wherein the intersection points form the pair of grasp points that represent a grasp for the first height map layer segment.

10. The method of claim 9, wherein the antipodal grasp generation process is performed to generate grasp points for a plurality of boundary points arranged at fixed distances along the boundary.

11. The method of claim 10, wherein the fixed distance is determined based on attributes of one or more of: a bin that contains objects to be grasped, a grasping manipulator, known objects, the image, and a sensing system.

12. The method of claim 1, further comprising filtering the grasps based on at least one of: gripper width, kinematic feasibility, or collision checking.

13. The method of claim 1, wherein selecting the generated grasp comprises: ordering the generated grasps.

14. The method of claim 13, wherein ordering the generated grasps comprises: ordering the generated grasps by decreasing height.

15. The method of claim 13, wherein ordering the generated grasps comprises: ordering the generated grasps based on at least one of: grasping manipulator collision, a graspability score, or an antipodality score.

16. The method of claim 1, wherein the grasping manipulator comprises a finger gripper.

17. The method of claim 16, wherein a height range of each height map layer corresponds to a graspable depth of the finger gripper.

18. A system comprising:
a sensing system;
a robotic controller;
a grasp processor; and
a storage device comprising machine-executable instructions that, when executed by the grasp processor, control the grasp processor to perform grasp selection for a scene of piled objects by performing operations comprising:
receiving scene data including a depth map and a two-dimensional (2D) image that characterizes the scene, the scene comprising a pile of objects, wherein the scene data is captured from above a maximum height of the pile of objects;
generating, from the depth map and the 2D image included in the scene data, a height map of the scene, wherein the height map comprise a respective height value for each of a plurality of height map points corresponding respectively to a plurality of 2D image pixels included in the 2D image;
partitioning the height map into a plurality of height map layers based on identifying height map points having height values that lie within a respective height range for each of the plurality of height map layers;
generating, for a first height map layer of the plurality of height map layers, a set of height map layer segments, wherein within the first height map layer of the plurality of height map layers, each height map layer segment includes height map points that correspond to a distinct object of the pile;
for at least one the first height map layer of the plurality of height map layers, generating a set of grasps having grasp points that are on a segment boundary of a first height map layer segment within the first height map layer; and
selecting a generated grasp; and
executing the selected grasp for a respective object corresponding to the height map layer segment of the selected grasp by controlling a grasping manipulator.

19. The system of claim 18,
further comprising: at least one end effector,
wherein the robotic controller is configured to generate control instructions based on the selected grasp and control the end effector to grasp an object within the scene at the selected grasp, and
wherein the sensing system includes a depth sensor.

* * * * *